Dec. 9, 1969   J. L. JERNIGAN   3,483,386
BRAGG ANGLE MATCHED FILTER FOR PRODUCING
AND RECOGNIZING CODED PULSES
Filed Dec. 4, 1967   2 Sheets-Sheet 1

INVENTOR.
JAMES L. JERNIGAN
BY Roy Miller
ATTORNEY

Dec. 9, 1969    J. L. JERNIGAN    3,483,386
BRAGG ANGLE MATCHED FILTER FOR PRODUCING
AND RECOGNIZING CODED PULSES
Filed Dec. 4, 1967    2 Sheets-Sheet 2
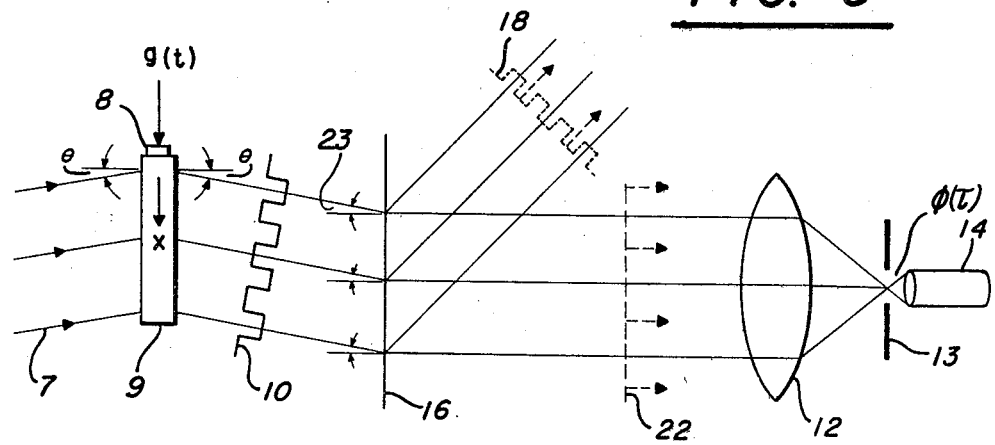
FIG. 3
FIG. 4
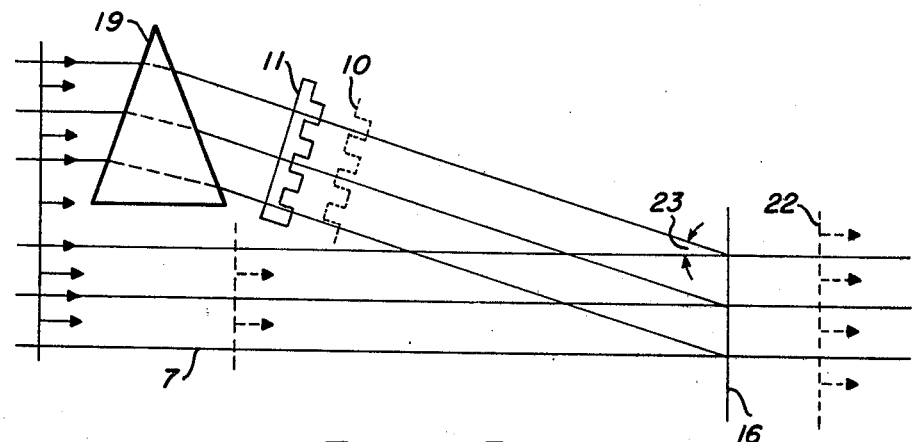
FIG. 5
INVENTOR.
JAMES L. JERNIGAN
BY
Roy Miller
ATTORNEY

3,483,386
BRAGG ANGLE MATCHED FILTER FOR PRODUCING AND RECOGNIZING CODED PULSES
James L. Jernigan, Ridgecrest, Calif., assignor to the United States of America as represented by the Secretary of the Navy
Filed Dec. 4, 1967, Ser. No. 687,805
Int. Cl. G02f 1/18
U.S. Cl. 250—216           9 Claims

ABSTRACT OF THE DISCLOSURE

A means for encoding and decoding monochromatic spatially coherent light comprising an ultrasonic delay cell modulator upon which said light impinges, a coded wave plate decoder and a photo-detector.

GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a matched filter system and more particularly to a system which uses the Bragg law to achieve light modulation.

Conventional optical data processors using ultrasonic waves are patterned after the method used by H. Hurvitz as disclosed in U.S. Patent No. 2,664,243.

The Hurvitz method uses Raman Nath diffraction phenomena to achieve the light modulation. Such devices have been unsatisfactory in that: The acoustic energy diffracts comparatively little of the light so the modulation efficiency is low; and the bandwidth is narrow because of the lower carrier frequency necessary to obtain Raman Nath diffraction.

SUMMARY

The invention provides a means for producing and recognizing coded pulses. Monochromatic spatially coherent light is directed onto an ultrasonic delay cell at an angle equal to that which satisfies the Bragg law. The delay cell modulates the light such that a coded wave-front emerges from it. The coded wave-front impinges in turn upon a wave plate which is designed to transform into a plane wave-front only a wave-front corresponding to the code placed on the wave plate. The plane wave is focused by a lens where it is detected by a photocell located behind a pinhole aperture.

The general purpose of this invention is to provide a matched optical filter system which can be used for encoding and decoding at frequencies above 200 mc. and which will have a high bandwidth on the order of 20 mc. The 200 mc. capability stems from the high carrier frequency necessary to produce efficient Bragg diffraction.

BRIEF DESCRIPTION OF THE DRAWINGS

FIG. 3 is a schematic of another embodiment of the invention using a hologram to perform the functions of the wave-plate;

FIG. 4 is a detailed plan view of the mask used to make deposits on the wave-plate; and FIG. 5 is a schematic diagram illustrating the making of the hologram detector of FIG. 3.

DESCRIPTION OF THE PREFERRED EMBODIMENTS

Figure 1:
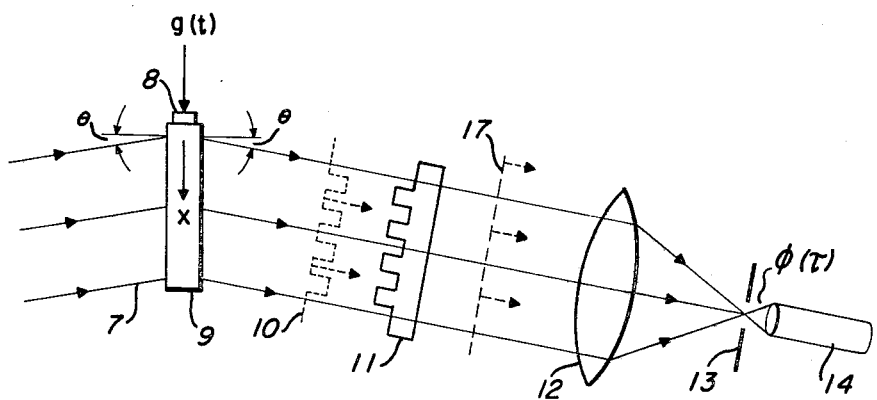
FIG. 1 is a schematic, partially in block diagram form, of a preferred embodiment of the invention.

FIG. 1 which illustrates a preferred embodiment of the invention, shows monochromatic spatially coherent light 7 impinging upon ultrasonic delay cell 9, at the Bragg angle $\theta$. Part of the coherent light 7 incident on the ultrasonic delay cell 9 will be diffracted at the Bragg angle which is satisfied by the relation $$n\lambda = 2\Omega \sin \theta$$

where $n$ = the order of diffraction;
$\lambda$ = wavelength of the monochromatic spatially coherent light source
$\Omega$ = ultrasonic wavelength and
$\theta$ = angle of incidence of the monochromatic spatially coherent light source to the direction of the ultrasonic velocity $x$.

When phase modulating electrical signal $g(t)$ is impressed upon ultrasonic transducer 8, the light wave emerging from the transducer 8 is modulated by $g(t)$ yielding the spatial function $g(x-\tau)$ where $x$ = direction of travel of the acoustic waves in delay cell 9
$\tau$ = delay interval in time and space of the delay cell 9.

Quartz wave plate 11 is constructed by depositing quartz through the mask 20 illustrated in FIG. 4. The spacing between the slots 21 is chosen to match the code placed on the light wave 10 by the acoustic modulation. This creates a coded relief of varying optical thickness.

As wave-front 10 impinges upon the coded wave-plate 11, the varying optical path length changes the phase of light traveling out of the coded wave plate so that the phase modulated wave-front 10 emerges from the wave-plate as a plane wave 17. This phenomena will occur only when a wave-front impressed with the proper code impinges upon the wave-plate 11. If an improperly coded wave-front impinges upon the wave-plate, a plane wave will not result.

The plane wave 17 emerging from the wave-plate 11 is focused by lens 12 through diffraction limited aperture 13 behind which a photo detector 14 indicates the presence or absence of incident plane waves. It should be noted that only a plane wave can be focused to pass through this aperture; a wave-front containing some phase modulation will not properly focus, therefore it will not be detected.

The light impinging on photo-cell detector 14 may be represented by the function $\phi(\tau)$ where $$\phi(\tau) = \int_0^x f(x) g(x-\tau) dt$$

wherein $f(x)$ = complex transfer function of the wave-plate 11 or hologram 16, and the delay interval $\tau$ is indicative of the delay cell 9.

The peak in the correlation function $\phi(\tau)$ occurs when the wave-front 10 matches the spatial pattern $f(x)$ of the wave-plate 11 or hologram 16.

Figure 2:
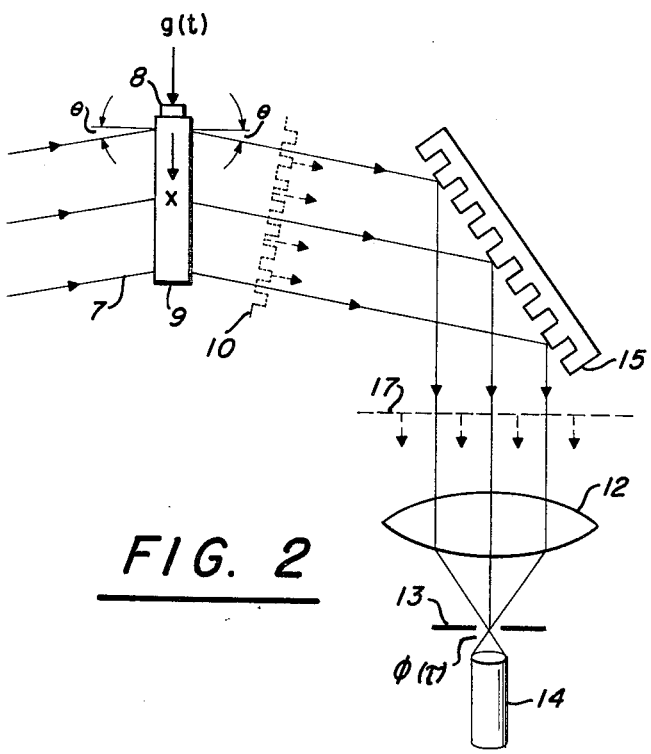
FIG. 2 is a schematic of an alternate embodiment of the invention utilizing a reflective wave-plate.

An alternate embodiment as shown in FIG. 2 uses an aluminum reflector 15 with aluminum deposited through the mask shown in FIG. 4 to act as the wave-plate. The spatial code on the wave-plate causes each ray of impinging light to travel a different distance. Thus the phase modulation impressed on wave-front 10 is detected and a plane wave-front 17 emerges which is focused by lens 12 onto aperture 13 and photo-detector 14.

FIG. 5 illustrates the making of a hologram detector. Incident monochromatic spatially coherent light 7 illuminates both hologram plate 16 and prism 19. The prism 19 directs the light at wave-plate 11 where the light is modulated by $f(x)$, the spatial complex transfer function. Phase modulated wave-front 10 impinges upon the hologram plate 16 an at angle 23 with respect to incident beam 7. This combining of the two beams results in a diffraction pattern. The plate is developed and is ready for use to detect phase-modulated wave front 10.

It is well known that holographic techniques permit super-imposition of several different codes at various angles. Thus it is within the scope of this disclosure to detect several different codes employing a plurality of photo-detectors placed at the various angles as required by the hologram pattern.

In FIG. 3, the phase modulated wave-front 10 impinges upon the hologram 16, and wave-front reconstruction takes place. The manner in which the wave-front 10 interacts with the density variations on the plate is similar to the interaction which occurs on a diffraction grating.

The plane-wavefront 7 which was originally recorded on the hologram, is reconstructed, and radiated as plane wave-front 22 at angle 23 with respect to the phase-modulated wave-front 10. The interaction of the hologram detector also produces phase modulated wave-front 18 which contains the same phase modulation as wave-front 10.

Plane wave-front 22 is focused by lens 12 onto aperture 13 and photo-detector 14.

Obviously, many modifications and variations of the present invention are possible in the light of the above teachings. It is therefore to be understood that, within the scope of the appended claims, the invention may be practiced otherwise than as specifically described.

What is claimed is:

1. A matched filter system for recognizing a coded pulse of a given character comprising:
a source of monochromatic spatially coherent light rays,
means for modulating said light rays in response to a coded modulating signal,
a wave-plate to detect the coded modulated wave and produce a plane wave output, and
a lens to focus said plane wave onto a photo-detector.

2. A matched filter system as described in claim 1 wherein said modulation means is comprised of an ultrasonic delay cell, and the modulation is phase modulation.

3. A matched filter system as described in claim 2 wherein said delay cell is positioned so that said light rays impinge upon the delay cell at the Bragg angle.

4. A matched filter system as described in claim 3 wherein said delay cell is positioned so that said light rays impinge upon the delay cell at the angle $\theta$, where $\theta$ is satisfied by the equation $$n\lambda = 2\Omega \sin \theta$$

where $n$ = the order of diffraction
$\lambda$ = wavelength of the monochromatic spatially coherent light source,
$\Omega$ = ultrasonic wavelength
$\theta$ = angle of incidence of the monochromatic spatially coherent light to the direction of the ultrasonic velocity.

5. A matched filter system as described in claim 4 wherein said wave-plate consists of quartz vapor deposited through a mask upon a quartz base to create a relief on the surface such that the phase delay due to the varying optical thickness will compensate the phase modulated code and produce a plane wave output.

6. A matched filter system as described in claim 4 wherein said wave-plate consists of aluminum deposited through a mask upon an aluminum reflector to create a relief on the surface such that the phase delay due to the varying optical thickness will compensate the phase modulated code and produce a plane wave output.

7. A matched filter system as described in claim 4 wherein said wave plate consists of a hologram.

8. A matched filter system as described in claim 6 wherein said hologram 11 comprises a phase-modulated diffraction grating.

9. A matched filter system as described in claim 4 wherein said photo-detector has an aperture comprised of a diffraction limited pinhole.

References Cited

UNITED STATES PATENTS

| | | | |
|---|---|---|---|
| 3,055,258 | 9/1962 | Hurvitz | 350—161 X |
| 3,189,746 | 6/1965 | Slobodin et al. | 350—161 X |
| 3,373,380 | 3/1968 | Adler | 350—160 X |
| 3,383,627 | 5/1968 | Desmares | 350—160 X |

RALPH G. NILSON, Primary Examiner

T. N. GRIGSBY, Assistant Examiner

U.S. Cl. X.R.

250—200; 350—160, 161